Sept. 29, 1970 G. H. FATHAUER 3,531,724

SIGNAL-SEEKING RADIO RECEIVER

Filed Aug. 23, 1968 4 Sheets-Sheet 1

INVENTOR.
GEORGE H. FATHAUER,
BY Wood, Tost, Driele & Lundy
ATTORNEYS.

INVENTOR:
GEORGE H. FATHAUER,
BY Wood, Herst, Crisk & Lundy
ATTORNEYS.

Sept. 29, 1970 G. H. FATHAUER 3,531,724

SIGNAL-SEEKING RADIO RECEIVER

Filed Aug. 23, 1968 4 Sheets-Sheet 3

INVENTOR.
GEORGE H. FATHAUER,
BY Wood, Gust, Irish & Lundy
ATTORNEYS.

INVENTOR:
GEORGE H. FATHAUER,
BY Wood, Gust, Irish & Lundy
ATTORNEYS.

United States Patent Office 3,531,724

Patented Sept. 29, 1970

3,531,724

SIGNAL-SEEKING RADIO RECEIVER

George H. Fathauer, Decatur, Ill., assignor to Electra Corporation, Cumberland, Ind., a corporation of Indiana Filed Aug. 23, 1968, Ser. No. 754,795
Int. Cl. H04q 3/18
U.S. Cl. 325—469 37 Claims

ABSTRACT OF THE DISCLOSURE

The invention is a signal-seeking receiver operable on several discrete preselected frequencies, electronic circuitry being employed for automatically switching the receiver from one of the frequencies to another in sequence until a signal is received on one of them. When such a signal is received, the receiver "locks in" on that frequency and receives the signal. Once the signal carrier terminates, the receiver continues its sequential switching operation until another signal or carrier appears on one of the frequencies.

BACKGROUND OF THE INVENTION

Field of the invention

The present invention relates to signal-seeking receivers and more particularly to a receiver, having no moving parts, which will automatically tune over a predetermined number of preselected frequencies and will stop automatically on one of the frequencies when a radio signal appears thereon.

DESCRIPTION OF THE PRIOR ART

In the past, signal-seeking receivers have utilized an electric motor for varying a tuning element such as a capacitor to tune the receiver over a predetermined frequency spectrum. Tuning of the receiver is arrested when a carrier wave is received. However, a motor-driven signal-seeking receiver has a number of disadvantages. The inertia of the motor and drive train tends to cause the receiver to tune past the frequency of a signal unless the receiver tunes at an extremely slow rate of speed. The motor and drive train is complicated, bulky and expensive, and such an arrangement is noisy in operation and consumes considerable power.

Further, such receivers usually tune over a complete frequency spectrum, responding to a signal of predetermined amplitude and then locking thereon. When such signal terminates, the receiver continues its tuning, stopping on the next signal of such predetermined amplitude. There is thus no way of determining on what specific frequency the receiver will "lock in."

It is therefore an object of this invention to provide a signal-seeking receiver in which the tuning is accomplished electronically rather than mechanically and the frequencies on which the receiver operates are predetermined.

It is another object of this invention to provide a signal-seeking receiver which will scan a multiplicity of predetermined frequencies automatically and will "lock in" on any one of these frequencies on which a signal appears.

It is yet another object of this invention to provide a unique arrangement in a signal-seeking receiver which employs unique switching circuitry capable of tuning the receiver with preciseness to a number of predetermined frequencies in sequence either automatically or manually.

Other objects will become apparent as the description proceeds.

SUMMARY OF THE INVENTION

The present invention relates to a signal-seeking radio receiver for automatically tuning to an adjacent channel or frequency in a predetermined frequency band, the receiver comprising a radio frequency amplifier broad tuned to cover a predetermined frequency spectrum, a local oscillator, a mixer and an audio amplifier operatively coupled to reproduce intelligence in a received radio signal. A first circuit in the receiver is utilized for generating a first signal in response to the received signal and a second signal in response to the absence of the received signal. This received signal may be in the form of amplitude or frequency modulation and more specifically may be the carrier thereof. A second circuit responsive to the second signal is utilized for switching automatically and sequentially the frequency of the local oscillator to individual ones of a predetermined plurality of frequencies whereby the receiver is correspondingly switched to receive radio frequency signals on as many different frequencies in said predetermined frequency band.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENTS

Figure 1:
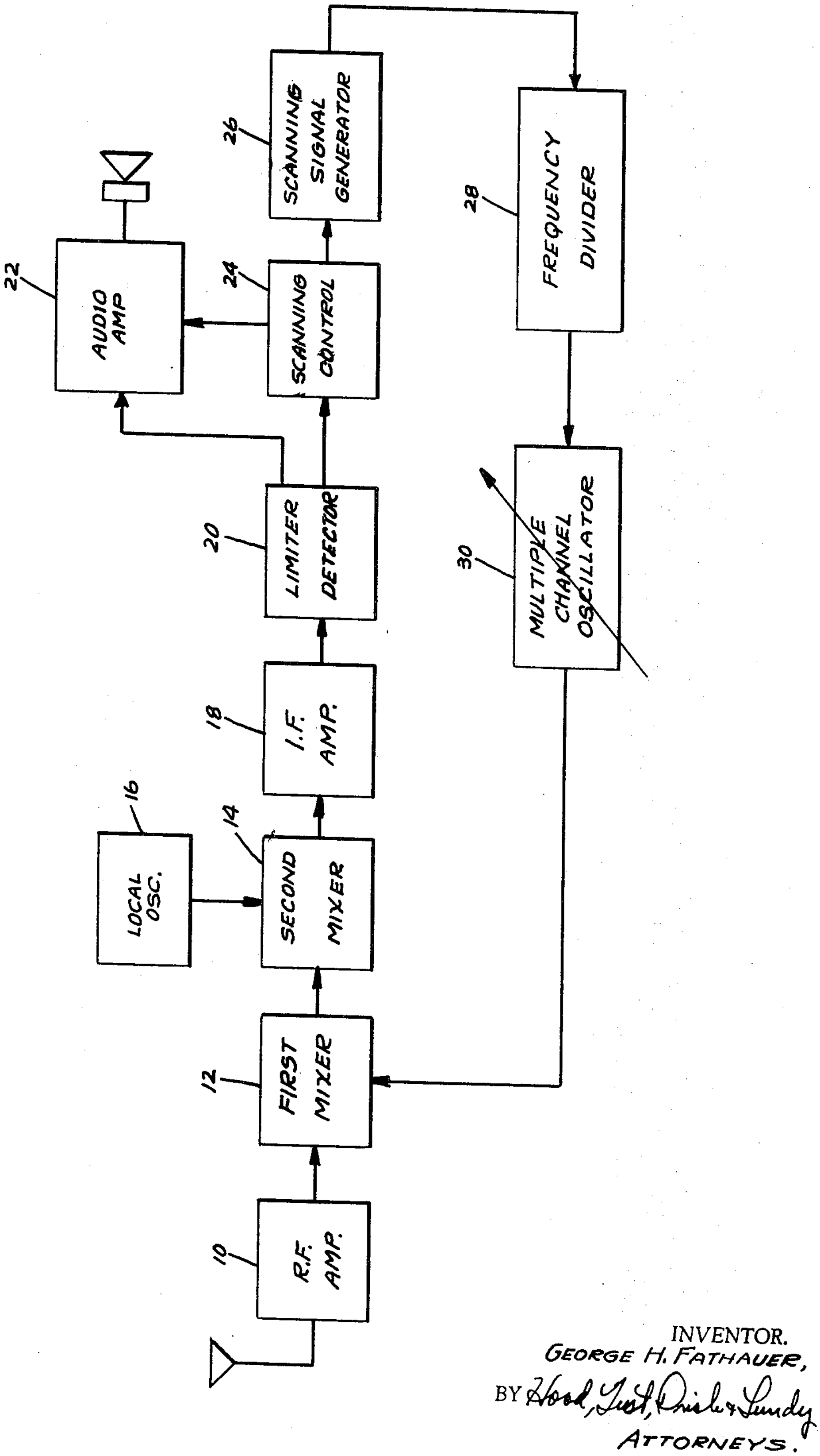
FIG. 1 is a block diagram of one embodiment of this invention.

Referring to FIG. 1, a radio receiver of the superheterodyne type, and more specifically a receiver adapted to receive and reproduce frequency modulated signals, includes a radio frequency amplifier 10, a first mixer 12, a second mixer 14, a local oscillator 16, an intermediate frequency amplifier 18, a limiter-detector 20, and an audio amplifier 22. The circuits represent a conventional FM receiver and need no furtrer elaboration here, except to say that the amplifier 10 is broad-tuned to a frequency spectrum within which the frequencies to be received are disposed. The remaining circuits 24, 26, 28 and 30 represent those portions of the present receiver which are not conventional and in combination render the receiver of the present invention unique. A schematic diagram of a working embodiment of this invention as depicted in FIG. 1 is shown in FIGS. 2*a* and 2*b*.

Figure 2A:
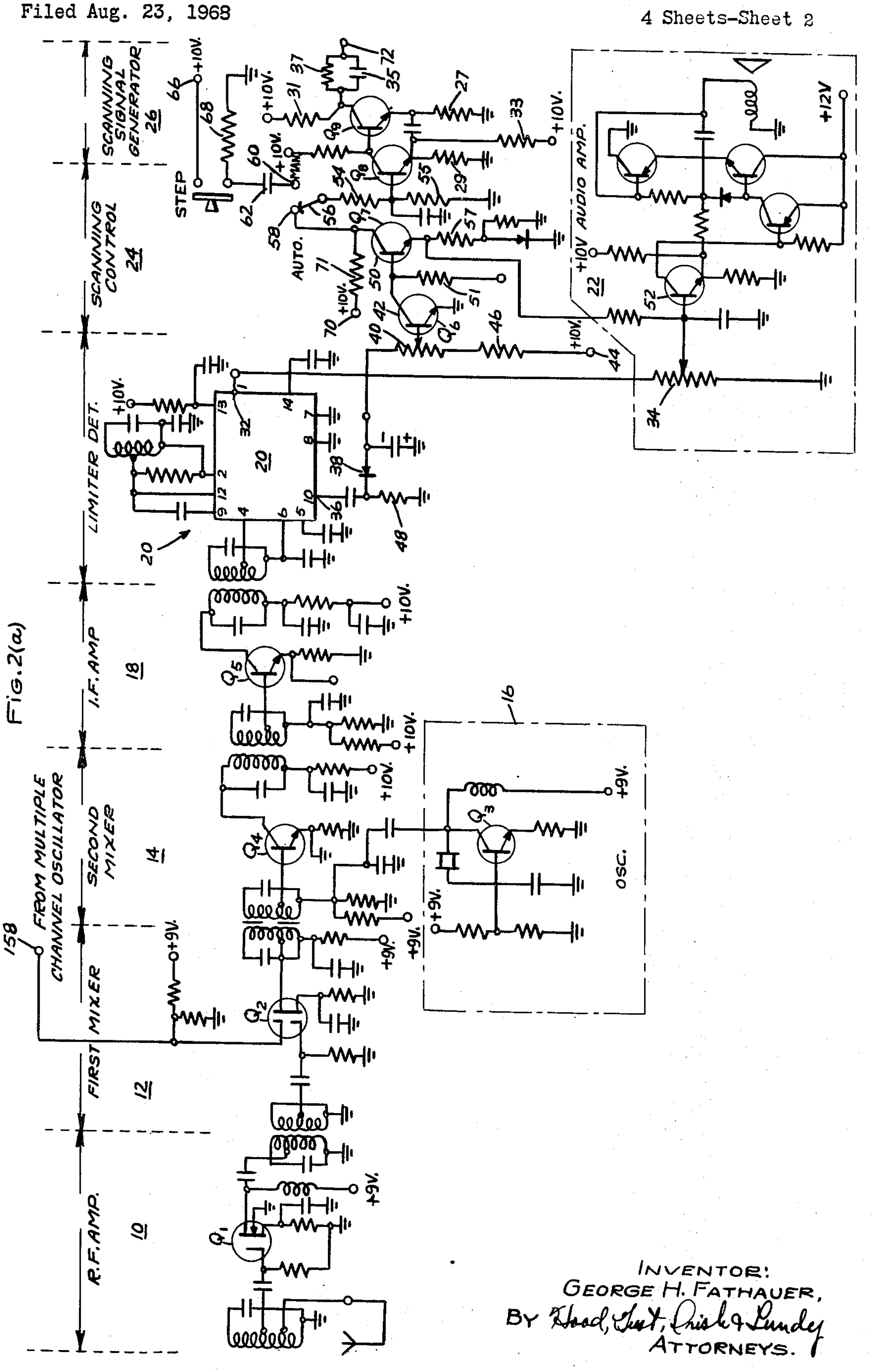
FIGS. 2*a* and 2*b* together constitute a diagram of the embodiment of FIG. 1.
Figure 2B:
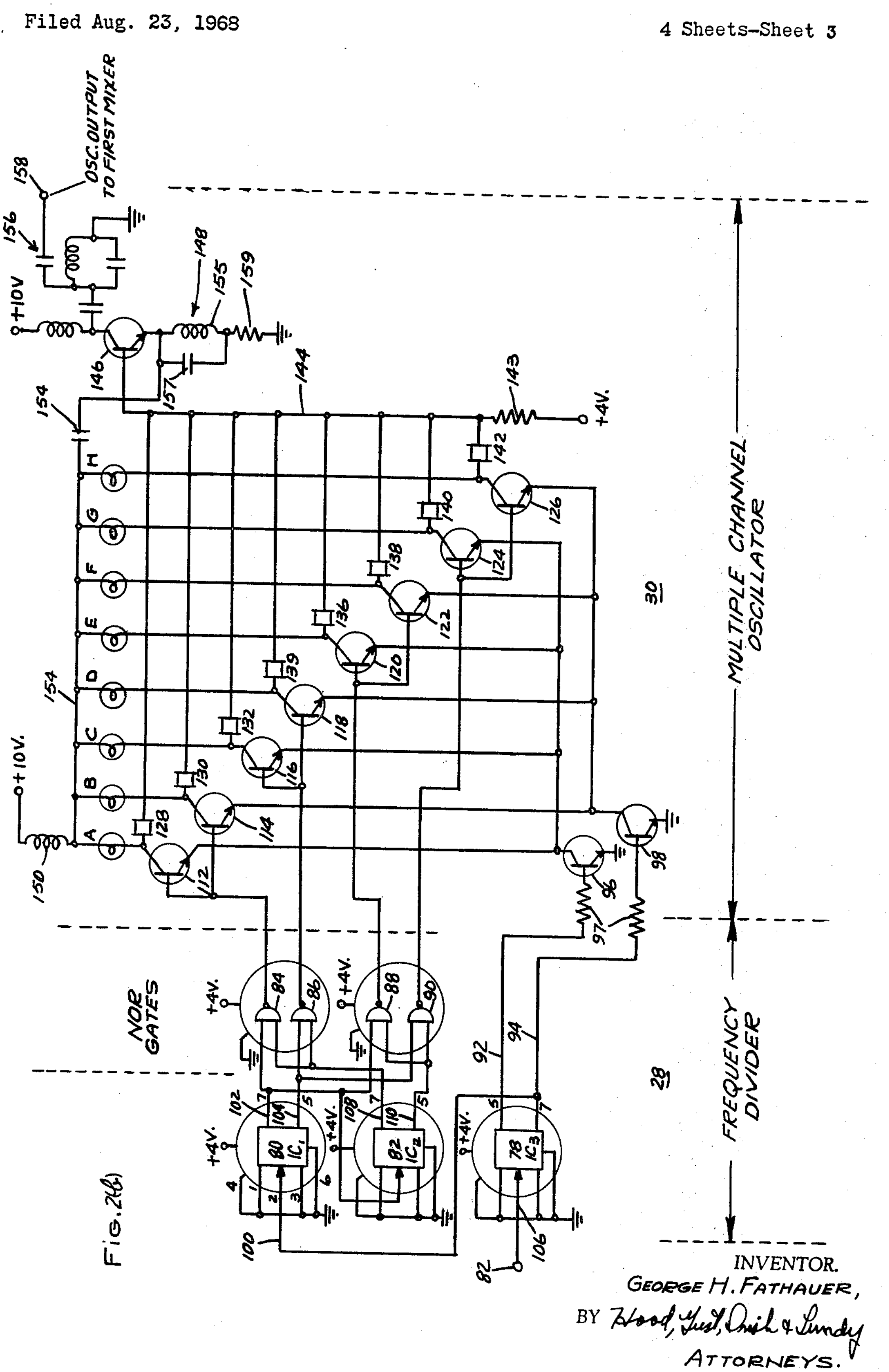

As shown in FIG. 2*a*, the limiter-detector 20 is an integrated circuit but may take the form of a wired or printed circuit without departing from the spirit and scope of this invention. Circuit 20 has a circuit indicated by the numeral 32 in which appears the demodulated audio output signals coupled to a conventional volume control 34. This volume control 34 is connected to the input circuit of the audio amplifier 22 as shown.

The limiter-detector 20 is also provided with a circuit connected to the output circuit of the IF amplifier 18 which delivers to a terminal 36 the conventional IF voltage or signal which results from a received signal. This voltage is rectified by a diode 38 and is applied across a squelch control 40 as a DC voltage. To the squelch control 40 is connected a transistor 42, the squelch control 40 being adjusted to render the transistor 42 conductive during the period no signal is being received by the receiver with the consequence that no IF voltage is applied to the terminal 36. Thus, a voltage is applied to the base of the transistor 42 from the B supply terminal 44 adequate to render the transistor 42 conductive, the control 40 being adjusted just to the point at which it is switched from non-conductive to a conductive state. The squelch control 40 is a part of a resistive voltage divider which includes the series-connected resistors 46 and 48.

The polarity of the diode 38 in the rectifying circuit is such that an opposite polarity voltage is applied to the squelch control 40 and the base of the transistor 42 in response to an IF voltage being applied to the terminal 36. Thus adjusted, the audio amplifier is disabled or otherwise quieted during periods when no signals are being received by the receiver but will be enabled to reproduce the audio portion of the received signal when such a signal is applied to the receiver. Such squelch control circuits are conventional in FM receivers. The particular squelch control circuit of this invention is further explained in the following.

As a part of the squelch control circuit, there is a transistor 50 connected to the transistor 42 as shown. When the transistor 42 is conducting, the base of the transistor 50 is effectively grounded and the transistor 50 is rendered non-conductive. Zero voltage thereupon appears on the emitter of the transistor 50 and this in turn is coupled to the input circuit of the audio amplifier 22 effectively, turning it "Off." When the transistor 42 is rendered non-conductive, the voltage on the base of the transistor 50 is raised sufficiently to render the latter conductive. This results in increasing the voltage on the emitter of the transistor 50 and consequently raising the voltage on the base of the input transistor 52 of the audio amplifier. This serves to turn the latter "On," such that it will reproduce audio intelligence.

A scanning signal generator 26 is in the form of a conventional free-running or astable multivibrator, and has a voltage divider consisting of two resistors 54 connected to the input circuit thereof as shown. One end of this voltage divider 54 is connected to the movable contact 56 of a single-pole, double-throw switch having one stator contact 58 connected to the collector of the transistor 50 and the other contact 60 connected to a capacitor 62 as shown. A normally open switch 64 has one contact connected to the capacitor 62 and the other contact connected to a terminal 66 to which is applied a source of voltage as shown. A resistor 68 is connected between the capacitor 62 and ground.

In the operation of the multivibrator 26, when the transistor 50 is in a non-conductive state and the switch contacts 56 and 58 are engaged as shown, the supply voltage from the terminal 70 is applied to the voltage divider 54 providing a bias for the multivibrator 26, causing the latter to operate. The alternating signal developed by the multivibrator 26 is applied to the output terminal 72 thereof, this signal being in the form of the wavetrain 74 shown in FIG. 3.

When the transistor 50 is switched to a conductive state, a circuit to ground is established through a resistor 76 which serves to lower the voltage applied to the divider 54 to a value sufficient to stop the operation of the multivibrator 26. Thus, during the period of time a radio frequency signal is being received by the receiver, the multivibrator 26 is rendered non-operable, but in the absence of such a received signal, the multivibrator 26 is rendered operable so as to produce continuously the wavetrain 74 of FIG. 3.

Referring to FIG. 2*b*, the frequency divider 28 includes three flip-flop multivibrators 78, 80 and 82 and four NOR gates 84, 86, 88 and 90 as shown. The particular multivibrators 78, 80 and 82 are integrated circuits; however, they may be of the conventional wired or printed circuit configuration without departing from this invention. These particular multivibrators have two opposite polarity output circuits in which appear the wavetrains shown in FIG. 3, these being explained in more detail later. The output terminal 72 of the multivibrator 26 is connected to the input circuit 82 of the multivibrator 78. The two output circuits 92 and 94 of the multivibrator 78 are connected to the bases of two transistors 96 and 98 as shown. The output circuit 94 is connected to the input circuit 100 of the multivibrator 80, while the two output circuits 102 and 104 thereof are connected to the NOR gates as will be explained later. The output circuit 102 is connected to the input circuit 106 of the multivibrator 82, while the two output circuits 108 and 110 of this multivibrator 82 are connected to the NOR gates, also as will be explained.

The NOR gates 84, 86, 88 and 90 are preferably integrated circuits as shown but also may be in the form of conventional wired or printed circuits. The input circuits thereof are interconnected with each other into the output circuits of the two multivibrators 80 and 82 as shown. These NOR gates are conventional in that the absence of two signals on both of the input terminals of one gate will result in the production of a signal in the output circuit thereof. On the other hand, if one or both of the input circuits have a signal applied thereto, then no signal will appear in the output circuit.

The multiple channel oscillator 30 of FIG. 1 is denoted by the same numeral in FIG. 2*b* and includes eight (8) switching transistors indicated by the numerals 112 through 126 inclusive. The bases of laterally adjacent transistors 112–126 are connected together as shown and in turn to respective ones of the output circuits of the NOR gates 84 through 90. The emitters of the transistors 112 through 126 are connected to the collectors of the transistors 96 and 98 as shown, the emitters of the latter being grounded. More particularly, the emitters of the transistors 112, 116, 120 and 124 are connected to the collector of the transistor 96 while the emitters of the remaining switching transistors are connected to the collector of the transistor 98.

It may be stated at this point that the two transistors 96 and 98 may be considered as being normally non-conductive.

To the collectors of the transistors 112–126 are connected a series of quartz or the like crystals 128–142. All of these crystals have one terminal connected to a common bus 144 which is connected to the base of transistor 146, which is a part of the local oscillator circuit generally indicated by the numeral 148. This oscillator circuit 148 in the circuit arrangement shown is a conventional Colpitts oscillator but may take any other suitable configuration without departing from the spirit and scope of this invention. The crystals 128 through 142 sequentially are connected into the circuit of the oscillator 148 and individually determine the frequency of oscillation thereof.

A series of lamps A through H are connected to the collectors of the transistors 112 through 126 as shown, respectively, a choke 150 being connected between a common bus 152 and B plus. The bottom of the choke 150 is connected to the emitter of transistor 146 by means of a capacitor 154 having but little reactance to RF signals. The oscillator 148 is provided with an output circuit containing a filter 156 for filtering out undesired frequency components, the oscillator signal generated by the oscillator appearing in this output circuit. This oscillator signal is coupled from the output circuit by means of a terminal 158 to the input circuit of the first mixer 12 as shown more clearly in FIG. 2*a*. Oscillations developed by the oscillator 148 are mixed with the incoming RF signal with the intermediate frequency being conventionally coupled to the second mixer having local oscillations supplied thereto by an oscillator 16, the second intermediate frequency resulting being fed to and amplified by the IF amplifier 18. Thus, the frequency of oscillation of the oscillator 148 (FIG. 2*b*) determines the frequency to which the receiver is tuned. It may now be stated that the crystals 128 through 142 are cut to different frequencies such that switching these crystals sequentially into the circuit of the oscillator 148 will determine the frequency of oscillations thereof. Inasmuch as the intermediate frequency output of the mixer 12 remains constant, a change in the frequency of oscillator 148 determines the incoming frequency to which the receiver may respond.

The frequency divider as one-bit ring counter 28 operates as follows. The multivibrator 78 is caused to operate or change its condition of conductivity by the occurrence of a negative-going excursion in the output signal from the multivibrator 26. This results in producing the two wavetrains indicated by the numerals 160 and 162 in FIG. 3, these signals repeating at half the rate of the signal 74 emitted by the multivibrator 26. It will be noted that these half-frequency signals 160 and 162 are of opposite polarity but in synchronism, and correspond to a single binary bit and its complement.

The signal coupled from the multivibrator 78 to the multivibrator 80 causes the latter to operate on the negative excursion of the signal 160, thereby producing in the output circuits thereof the two signals or wavetrains indicated by the numerals 164 and 166. It will be noted that these signals 164 and 166 are of opposite polarity and at half the repetition rate of the signals 160, 162. These two multivibrators 78 and 80 constitute a two bit binary counter in which the four output signals 164, 166, 168, 170 correspond to the two binary bits and their complement.

Similarly, the output from the multivibrator 80 triggers operation of the multivibrator 82 to produce in the output circuit thereof the two wavetrains indicated by the two numerals 168 and 170. These latter signals are at half the repetition rate of the signals 164 and 166 and occur on the negative excursion of the signal 164.

Figure 3:
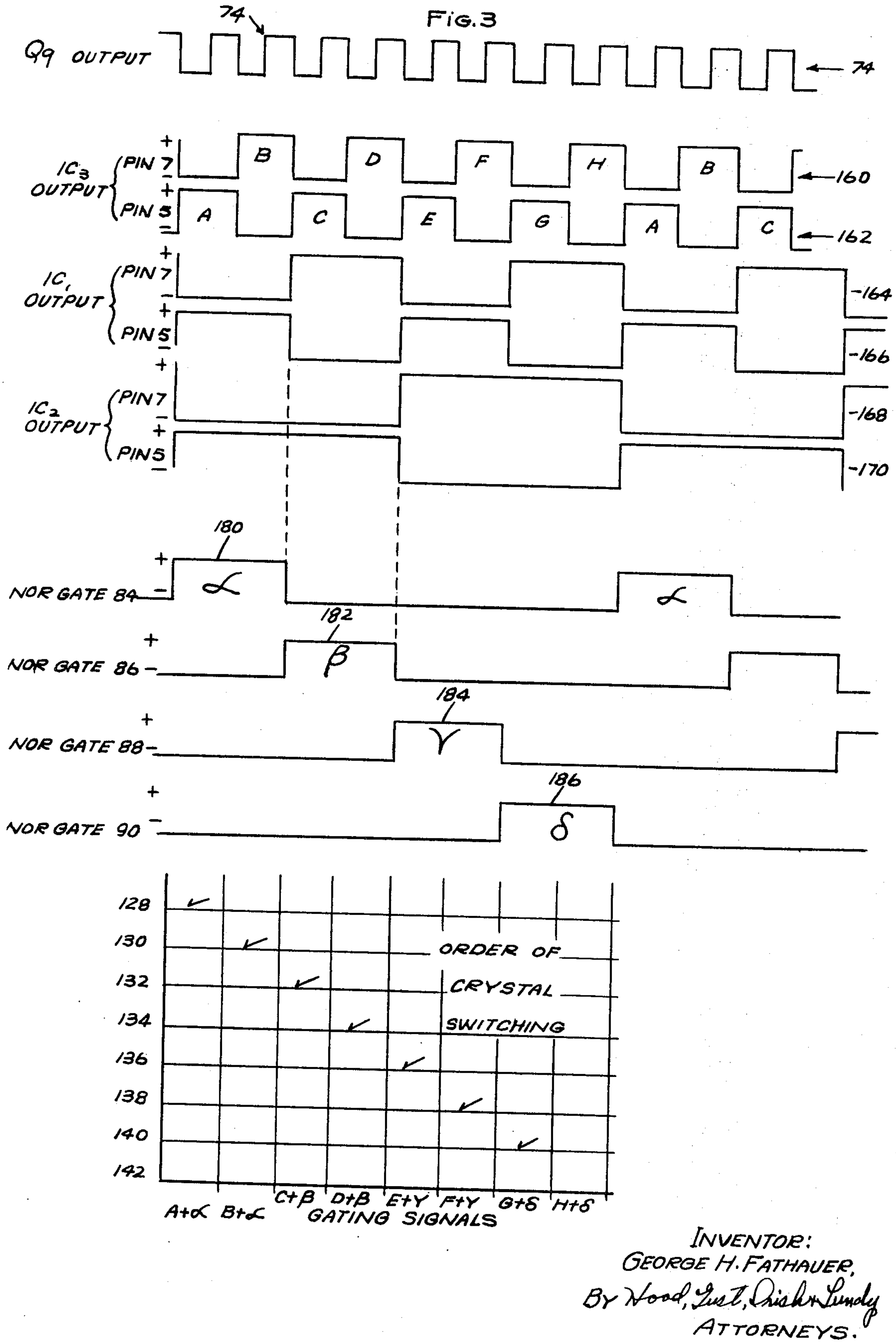
FIG. 3 illustrates waveforms and charts used in explaining the operations of this invention.

The output signals from the two multivibrators 80 and 82 are applied in logical pairs in synchronism to the input circuits of the NOR gates 84 through 90 in the time-based pattern shown in FIG. 3; for example, during the time two negative-going signals in the wavetrains 164 and 168 are applied to the two input circuits of the NOR gate 84, the latter will produce in the output circuit thereof a signal in the form of the positive-square wave 180. None of the other NOR gates 86 through 90 will simultaneously therewith produce any kind of a signal in the output circuits thereof, because none of them have two simultaneously applied negative-going signals applied to the input circuits thereof. However, in the next instant of time, the NOR gate 86 has two negative-going signals in the waves 166 and 168 applied to the input circuits thereof resulting in the production of the square wave output 182. The other two NOR gates 88 and 90 similarly respond to negative-going signals in the output circuits of the two multivibrators 80 and 82, producing in time sequence the two positive signals 184 and 186. In combination, the two multivibrators 80, 82 and the four NOR gates 84, 86, 88 and 90 form a four digit ring counter in which the four output signals 180, 182, 184, and 186 occur repetitively in sequence during each cycle of the ring counter. Thus, considering the NOR gates in FIG. 2*b* from the top down, the signals 180 through 186 will appear in the respective output circuits thereof in the time sequence pattern shown in FIG. 3, each of the signals 180 through 186 occurring when both of the respective signals of the "logical pairs" of signals 160, 162, and 164 through 170, applied to its respective NOR gate, are negative. This means that the adjacent pairs 112, 114, et cetera, of the transistors 112 through 126 will have positive-going signals applied to the bases thereof. At one instant of time, the two transistors 112, 114 will have the signal 180 applied thereto, in the next instant of time the two transistors 116, 118 will have the signal 182 applied thereto, and so on.

The signals 160 and 162 (FIG. 3) in the two output circuits of the multivibrator or one-bit ring counter 78 are applied to the bases of the two enabling transistors 96 and 98. For example, referring to FIG. 3, at the beginning of the wavetrain 162, the transistor 96 has the positive pulse A from the wavetrain 162 applied to the base thereof, while the base of the transistor 98 has the negative pulse from the wavetrain 160. This results in the transistor 96, which is normally non-conductive, being rendered conductive so as to ground the emitter of transistors 112, 116, 120 and 124. During the next cycle, the wave applied to the transistor 96 will be negative, thereby cutting the latter "Off," but will be positive (wave B) as applied to the transistor 98, rendering it conductive. This results in transistors 114, 118, 122 and 126 having the emitters thereof grounded and connected into the circuit of the oscillator 148. In FIG. 3, the letters A, B, C, D, E, F, G and H in the wavetrains 160 and 162 indicate the positive excursions thereof which render the two transistors 96 and 98 alternately conductive.

Considering the circuit operation at the instant of the occurrence of wave A in the signal 162, this results in keying the transistor 96 to a conductive state, thereby grounding the emitter thereof which couples the same into the circuit of the oscillator 148. This results in the emitters of the four transistors 112, 116, 120 and 124 being grounded also. Simultaneously, a pulse 180 (FIG. 3) is being developed by the NOR gate 84 of the four digit ring counter which biases the two transistors 112 and 114 to conductive condition. Since the emitter of only the transistor 112 is grounded, transistor 98 being nonconductive thereby lifting the emitter of transistor 114 off ground, only the crystal 128 will be connected into the circuit of the oscillator 148. Thus, the crystal 128 is connected into the circuit of the oscillator 148 only during the simultaneous occurrence of the "logical pair" of signals A and 180. This results in the oscillator 148 oscillating at a frequency as determined by the operating frequency of the crystal 128. This frequency determines the output frequency of the first mixer 12 (FIG. 1) and consequently the frequency to which the receiver is tuned or is otherwise receptive.

In the next instant of time, during the occurrence of wave B in signal 160 (FIG. 3), transistor 96 is turned "Off" and transistor 98 "On." This results in grounding the emitters of the transistors 114, 118, 122 and 126 and effectively disconnecting the emitters of the remaining transistors from the oscillator 148. Since the signal 180 from the NOR gate 84 is still occurring, the transistor 114 will be rendered conductive while the transistor 112 will be cut off. Again, the two transistors 98 and 114 are rendered conductive by the simultaneous occurrence of the logical pair of signals B and 180. This places crystal 130 into the oscillator circuit, thereby causing the latter to oscillate at the frequency determined thereby. It may be stated at this point that all of the crystals 128 through 142 are cut to different frequencies such that the output frequency of the oscillator 148 will be changed as these crystals are switched into and out of the circuit thereof.

In the next instant of time, during the occurrence of the wave C of the signal 162, using the logic previously explained, the transistor 116 will be switched "On" and the crystal 132 will be connected into the oscillator circuit 148. The chart at the bottom of FIG. 3 illustrates the sequence of crystal switching, the check marks indicating the instant of time in which the particular crystal is connected into the oscillator circuit 148. This graph indicates the time coincidence required between the gating signals from the NOR gates 84 through 90 and the positive excursions of the signals 160 and 162 from the enabling multivibrator 78 in order to switch a particular one of the crystals 128 through 142 into the circuit of the oscillator 148. By regarding the positive excursions of the two wavetrains 160 and 162 as enabling signals and identifying these by the letters A through H in FIG. 3, and the signals 180 through 186 from the NOR gates as gating signals and identifying these by the Greek letters alpha (α), beta (β), gamma (γ) and delta (δ), the chart at the bottom of FIG. 3 may be made wherein the required time coincidence between logical pairs of these enabling and gating signals is shown for switching a particular one of the crystals into the circuit of the oscillator 148. For example, addition or time coincidence of the logical pair of pulses A and alpha (α), results in crystal 128 being connected into the oscillator circuit. Time coincidence of the logical pair of pulse B and alpha (α) results in crystal 130 being connected into the circuit, and so on. As each one of these crystals is connected into the oscillator circuit, the responsive frequency of the receiver is changed.

In a working embodiment of this invention, the multivibrator 26 is caused to operate at a frequency of about 16 cycles per second. This results in the crystals 128 through 142 being individually switched into the oscillator circuit twice each second, or in other words the train of crystals 128 through 142 being sequentially switched into and out of the oscillator circuit once each half-second. The crystals are sequentially continuously switched into and out of the oscillator circuit at a uniform rate, this action being referred to as frequency or channel scanning.

Recapitulating, when no radio frequency signal is being received by the receiver, the receiver is quieted by means of the squelch signal and the multivibrator 26 is caused to operate, thereby producing the frequency scanning operation in which the receiver is caused to be tuned sequentially to eight (8) different frequencies, these being determined by the frequencies of the crystals 128 through 142. It should be stated at this point that the RF amplifier 10 is designed to received and amplify the entire frequency spectrum within which the receiver is to be operated. The frequencies of the crystals 128 through 142 are so selected that when they are mixed with the signals in this spectrum, the particular frequency in this spectrum will be selected as the one to which the receiver is tuned.

At any instant, if an RF signal appears on one of the frequencies to which the receiver is tuned, the squelch control is operated to open or render operative the audio amplifier 22 and to stop the operation of the multivibrator 26. This results in stopping the operation of the frequency divider 28 and locking "in" the particular crystal 128 through 142 which happens to be in the circuit of the oscillator 148 at the time the RF signal was being received into the oscillator circuit. So long as this RF signal is being received, the particular crystal will be the one controlling the frequency of the oscillator 148. The moment the particular carrier terminates, or in other words the carrier goes off the air, the squelch circuit will become operative to quiet the audio amplifier and to cause operation on the multivibrator 26. This results in restarting the frequency-scanning operation, whereupon the crystals are sequentially connected into the oscillator circuit 148, rendering the receiver sensitive to the particular channels or frequencies being searched by the receiver. The moment a signal appears on any one of the other channels or even the same channel as previously received, the particular crystal will be "locked in" and the oscillator 148 will be caused to oscillate continuously at the particular frequency.

This operation is automatic and continuous and requires no operator manipulation in order to search and monitor a multiplicity of signals on a predetermined number of frequencies or channels.

In some instances, it is desirable to manually switch the receiver from one channel to another. This is accomplished by moving the switch contact 56 from the contact 58 to the contact 60. This results in stopping the operation of the multivibrator 26 and the frequency scanning operation of the oscillator 148. By closing the stepping switch 64, the capacitor 62 will immediately be charged, producing a transient voltage pulse which is coupled to the voltage divider 54 of the multivibrator 26. This causes the latter to cycle once, thereby stepping the oscillltor 148 to the next succeeding crystal frequency. Each time the stepping switch 64 is operated, the next succeeding crystal will be switched into the oscillator circuit, thereby tuning the receiver to the next succeeding channel which is desired to be monitored.

Referring to FIG. 2(*b*), it will be noted that a series of lamps A through H are connected to the collectors of the various transistors 112 through 126. As each transistor 112 through 126 is switched "On," the respective lamp A through H will be lighted to indicate the particular channel to which the receiver is tuned.

While the receiver has been described as being one specifically adapted to receive frequency modulated signals, it will appear as obvious to persons skilled in the art that an AM receiver as well as other receivers may be employed without departing from the spirit and scope of this invention.

While the various components and values thereof may vary without departing from the spirit and scope of this invention, various components are identified specifically in the following with respect to a working embodiment of this invention.

| | |
|---|---|
| Limiter-detector **20** | Sprague Type ULN–2111A. |
| Multivibrators **78, 80, 82** | Fairchild Type 9923. |
| NOR gates **84, 86** and **88, 90** | Fairchild Type 9914. |
| Squelch control **40** | 5,000 ohms. |
| Resistors: | |
| **46** | 56,000 ohms. |
| **48** | 2,200 ohms. |
| **51** | 39,000 ohms. |
| **76** | 1,000 ohms. |
| **77** | 1,500 ohms. |
| **71** | 33,000 ohms. |
| **55** | 47,000 ohms. |
| **57** | 68,000 ohms. |
| **27** | 33,000 ohms. |
| **29** | 15,000 ohms. |
| **31** | 2,200 ohms. |
| **33** | 470,000 ohms. |
| **35** | 220 pf. |
| **37** | 47,000 ohms. |
| **97** | 470 ohms. |
| Choke **150** | 4.7 μh. |
| Resistor **143** | 6,800 ohms. |
| Capacitor **154** | .01 mfd. |
| Choke **155** | 1 μh. |
| Capacitor **157** | 47 pf. |
| Resistor **159** | 470 ohms. |

The illustrated receiver is adapted to operate in the VHF frequency spectrum.

The oscillator 148 is designed to triple the crystal frequency so as to bring the receiver within the range of the frequency spectrum to be received. Obviously, oscillators designed to operate without frequency multiplication can be used without departing from the concept of this invention.

While there have been described above the principles of this invention in connection with specific apparatus, it is to be clearly understood that this description is made only by way of example and not as a limitation to the scope of the invention.

What is claimed is:

1. For use in a signal-seeking receiver for automatically tuning to individual ones of a predetermined plurality of radio frequencies, which includes means for receiving radio frequency signals and reproducing the intelligence therein, the combination comprising, (a) means including a tuning circuit having a plurality of frequency-determining means for tuning said receiving means to receive said plurality of radio frequencies, (b) first means for providing a first control signal in response to reception of a radio frequency signal on one of said radio frequencies, (c) second means responsive to the absence of said first signal for automatically and repetitively sequentially selecting said plurality of frequency-determining means whereby said receiver is correspondingly repetitively sequentially tuned to receive said plurality of radio frequencies and responsive to the presence of said first control signal for terminating said selecting action whereby said tuning means remains on the frequency selected at the time of said termination, (d) said second means including (1) signal-generating means for producing enabling and gating signals repetitive at different rates in predetermined phase relation, predetermined ones of said enabling and gating signals being synchronized to occur repetitively in time coincidence, and (2) a plurality of switching circuits coupled to said signal-generating means which are responsive individually and sequentially to said predetermined ones of said enabling and gating signals.

2. The combination of claim 1 in which said frequency-determining means include a plurality of crystals, each crystal having a different one of said switching circuits coupled thereto, and each switching circuit including gating and enabling switch devices responsive to said predetermined ones of said gating and enabling signals for connecting the respective crystal into said oscillator circuit.

3. The combination of claim 2 in which an enabling switch device is a switching transistor, said transistor having the base thereof connected to said signal-generating means and being biased alternately between conductive and non-conductive states by said enabling signals, and said gating switch-devices are transistors having the collectors and emitters thereof connected in series with the collector and emitter of said enabling transistor, and the bases of said gating transistors being connected to said signal-generating means and being biased alternately between conductive and non-conductive states by said gating signals.

4. The combination of claim 37 in which said manual means includes a normally open switch connected in series with a charging capacitor, a resistor coupled in shunt with said capacitor, and a source of voltage coupled across said switch and capacitor, whereby closure of said switch results in producing a pulse of voltage across said capacitor having a characteristic depending upon the time constant of the capacitor and resistor circuit.

5. The combination of claim 35 in which said gates are NOR gates.

6. The combination of claim 33 in which said scanning-signal generator is a first free-running multivibrator; said enabling circuit being a second flip-flop multivabrator having two output circuits, said second multivibrator including means for producing in ssaid output circuit, two repetitive signals, respectively, of opposite polarity at a frequency one-half that of said first multivibrator; said gating circuit including third and fourth multivibrators each having one input and two output circuits, one output circuit of said second multivibrator being connected to the input circuit of said third multivibrator, one output circuit of said third multivibrator being connected to the input circuit of said fourth multivibrator, each said third and fourth multivibrators producing opposite polarity signals in the output circuits at half the frequency of the preceding multivibrator.

7. For use in a signal-seeking receiver for automatically tuning to individual ones of a predetermined plurality of frequencies comprising a broad-tuned radio frequency amplifier, oscillator means, a mixer and an amplifier operatively coupled to reproduce intelligence in a received radio frequency signal, said oscillator means being coupled to said mixer for producing an intermediate frequency signal, the combination comprising, (a) first means in said receiver for providing a first control signal in response to a received signal and a second control signal in response to the absence thereof, (b) a switch matrix including a plurality of enabling-switch elements and a plurality of gating-switch elements, said gating-switch elements being operably connected together in groups, each gating-switch element of a group being series connected to a different one of said enabling switch-elements to form a respective switching circuit, (c) signal-generating means responsive to said second control signal for switching said switching circuits in time-sequence, (1) means included in said signal-generating means responsive to said first control signal for terminating said switching action and locking said oscillator means on the frequency to which it was switched at the time of said termination;

(2) said signal-generating means further including a pulse-generating circuit which generates a train of pulses at a predetermined repetition rate, and (d) said oscillator means including a plurality of frequency-determining circuits, there being one switching circuit for each frequency-determining circuit, each switching circuit being connected to the respective frequency-determining circuit whereby operation of any one switching circuit from an OFF condition to an ON condition activates the frequency-determining circuit coupled thereto, all of said switching circuits being in an OFF condition except when activated by said pulses.

8. The combination of claim 7 in which said oscillator means includes an amplifier having a control element, each said frequency-determining circuit and its switching circuit being conected in series with each other and said control element, said switching circuits being normally non-conductive, each switching circuit having a control element responsive to said pulses to render the switching circuit conductive.

9. The combination of claim 8 in which each frequency-determining circuit includes a crystal and each switching circuit includes a transistor, each crystal being series connected betwen the control element of said oscillator and the collector of the last-mentioned transistor.

10. The combination of claim 7 including a plurality of visual indicators electrically energizable to provide a visual indication of being energized, said indicators being series connected, respectively, with said switching circuits, there being one indicator for one switching circuit, whereby activation of each switching circuit to ON condition energizes the corresponding indicator.

11. The combination of claim 2 including a plurality of indicators electrically energizable to provide a visual indication of being energized, said indicators being operably connected, respectively, to said switching circuits, there being as many switching circuits as crystals, one switching circuit for each crystal, and a source of potential series connected with each said switching circuit and the indicator connected thereto, said source of potential also being coupled to said oscillator for energizing the same.

12. The combination of claim 8 including a plurality of indicators electrically energizable to provide a visual indication of being energized, said indicators being connected, respectively, to said switching circuits, and a source of potential connected to said amplifier control element at a point in the circuit thereof between the switching circuit and the amplifier control element, said source of potential also being series connected with each switching circuit and the indicator connected thereto.

13. The combination of claim 12 in which said manually operable actuating circuit includes a mechanical switch having two terminals, one terminal having a source of operating potential connected thereto, a charging capacitor series connected between said input circuit and the other terminal, whereby operation of said switch sequences said receiver to the next successive frequency of its predetermined radio frequencies.

14. The combination of claim 1 wherein said signal-generating means includes a scanning-signal generator which generates a repeating signal at a predetermined repetition rate, and frequency-dividing circuitry coupled to said scanning-signal generator for generating said enabling and said gating signals, respectively, at different rates proportional to the repetition rate of said repeating signal.

15. The combniation of claim 14 including a plurality of indicators electrically energizable to provide a visual indication of being energized, said indicators being connected, respectively, to said frequency-determining means, and means energizing each lamp in response to selection of the respective frequency-determining means thereby providing a visual indication of the radio frequency to which the receiver is tuned.

16. The combination of claim 14 wherein said scanning-signal generator includes a multivibrator having input and output circuits, said multivibrator including two transistors, the input circuit being coupled to the base of one transistor and the output circuit being coupled to the collector of the other transistor, the collector of the first transistor being coupled to the base of the other transistor, the emitters of both transistors being connected to a source of reference potential, a capacitor being coupled between said emitters, means connecting both collectors and the emitter of said first transistor to a source of operating potential, said input circuit including a resistor and a capacitor connected in shunt, said output circuit including a resistor and a capacitor connected in shunt.

17. The combination of claim 14 wherein said scanning-signal generator has input and output circuits, said input circuit being connected to said first means and said output circuit to said sequential-switching circuit, said generator including biasing means responsive to said first signal to prevent generation of said repeating signal and to the absence of said first signal to cause generation of said repeating signal, switch means for disconnecting said input circuit from said first means, and a manually operable actuating circuit connected to said input circuit for momentarily actuating said scanning-signal generator to produce only a predetermined portion of said repeating signal sufficient to switch said oscillator to the next successive frequency of its predetermined frequencies.

18. For use in a signal-seeking receiver for automatically tuning to individual ones of a predetermined plurality of radio frequencies which includes means for receiving radio frequencies which includes means for receiving radio frequency signals and reproducing the intelligence therein, the combination comprising (a) means including a tuning circuit having a plurality of frequency-determining means for tuning said receiving means to receive said plurality of radio frequencies, (b) first means for providing a first control signal in response to reception of a radio frequency signal on one of said radio frequencies, (c) second means responsive to the absence of said first signal for automatically and repetitively sequentially selecting said plurality of frequency-determining means whereby said receiver is correspondingly repetitively sequentially tuned to receive said plurality of radio frequencies and responsive to the presence of said first signal for terminating said selecting action whereby said tuning means remains on the frequency selected at the time of said termination, (d) said second means including signal-generating means for producing repeating switching signals at a predetermined repetition rate, a plurality of switching circuits coupled to said signal-generating means actuable in response to said switching signals, means connecting each of said switching circuits to a different one of said frequency-determining means for switching selectively each frequency-determining means into and out of said tuning circuit, (e) said frequency-determining means includes a plurality of crystals, each crystal having a different one of said switching circuits series connected thereto, (f) a plurality of electrically energizable visual indicators each series connected with a different one of said switching circuits, and (g) a source of energizing voltage connected across said series connected indicators and switching circuits for energizing each indicator when the respective switching circuit is actuated.

19. The combination of claim 18 in which said tuning circuit includes an oscillator provided with said crystals, said oscillator including an amplifier having a control element which is connected to said crystals, said crystals being connected into the circuits of said series connected indicators and switching circuits at the points of connection therebetween.

20. For use in a signal-seeking receiver for automatically tuning to individual ones of a predetermined plurality of radio frequencies which includes means for receiving radio frequency signals and reproducing the intelligence therein, the combination of, (a) means including a tuning circuit having a plurality of frequency-determining means for tuning said receiving means to receive said plurality of radio frequencies, (b) first means for providing a first control signal in response to reception of a radio frequency signal on one of said radio frequencies, (c) second means responsive to the absence of said first signal for automatically and repetitively sequentially selecting said plurality of frequency-determining means whereby said receiver is correspondingly repetitively sequentially tuned to receive said plurality of radio frequencies and responsive to the presence of said first signal for terminating said selecting action whereby said tuning means remains on the frequency selected at the time of said termination, (d) said second means including signal-generating means for producing repeating switching signals at a predetermined repetition rate, a plurality of switching circuits coupled to said signal-generating means actuable in response to said switching signals, means connecting each of said switching circuits to a different one of said frequency-determining means for switching selectively each frequency-determining means into and out of said tuning circuit, and (e) means for manually controlling said signal-generating means to produce a predetermined number of said repeating signals, whereby the switching operation aforesaid may be manually performed sequentially as aforesaid.

21. The combination of claim 20 in which said manual means includes a normally open switch connected in series with a charging capacitor, a resistance coupled in series with said capacitor, and a source of voltage coupled across said switch, capacitor and resistance.

22. The combination of claim 20 including switch means for disabling said signal-generating means from producing said repeating signals, and a manually operable actuating circuit connected to said signal-generating means for actuating the same only momentarily for producing a predetermined portion of said repeating signal sufficient to sequentially switch said tuning circuit.

23. The combination of claim 22 in which said manually operable actuating circuit includes a mechanical switch having two terminals, one terminal having a source of operating potential connected thereto, a charging capacitor series connected between said signal-generating means and the other terminal, whereby operation of said switch sequences said receiver to the next successive frequency of its predetermined radio frequencies.

24. The combination of claim 23 wherein said signal-generating means includes a multivibrator having input and output circuits, said charging capacitor being connected between said input circuit and the other terminal, said multivibrator including two transistors, the input circuit being coupled to the base of one transistor and the output circuit being coupled to the collector of the other transistor, the collector of the first transistor being coupled to the base of the other transistor, the emitters of both transistors being connected to a source of reference potential, a capacitor being coupled between said emitters, means connecting both collectors and the emitter of said first transistor to a source of operating potential, said input circuit including a resistor and a capacitor connected in shunt, said output circuit including a resistor and a capacitor connected in shunt.

25. For use in a signal-seeking receiver for automatically tuning to individual ones of a predetermined plurality of radio frequencies which includes means for receiving radio frequency signals and reproducing the intelligence therein, the combination comprising, (a) means including a tuning circuit having a plurality of frequency-determining means for tuning said receiving means to receive said plurality of radio frequencies, (1) said frequency-determining means including a plurality of crystals in an oscillator circuit, said oscillator circuit including an amplifier, one terminal of each crystal being coupled to said amplifier and the other terminal to said amplifier by means of individual switching circuits, there being a different switching circuit for each crystal, (b) first means for providing a first control signal in response to reception of a radio frequency signal on one of said radio frequencies, (c) second means responsive to the absence of said first signal for automatically and repetitively sequentially selecting said plurality of crystals whereby said receiver is correspondingly repetitively sequentially tuned to receive said purality of radio frequencies and responsive to the presence of said first signal for terminating said selecting action whereby said tuning means remains on the frequency selected at the time of said termination, and (d) said second means including said switching circuits each of which comprises:

(1) two series connected semi-conductive devices in series with a respective one of said crystals, (2) means for rendering said two semi-conductive devices simultaneously conductive whereby simultaneous conduction by both semi-conductors results in operatively connecting the respective crystal into said oscillator circuit.

26. The combination of claim 25 in which said semi-conductive devices are transistors, a plurality of electrically energizable visual inductors connected to said transistors respectively, there being one indicator for each two series-connected transistors, and circuit means including said transistors and indicators for energizing said indicators individually upon rendering the respective transistors conductive.

27. The combination of claim 25 in which said semi-conductive devices are transistors, one being characterized as a gating transistor and the other an enabling transistor, there being more gating transistors than enabling transistors, said gating transistors being connected in at least two discrete circuit groups, there being at least two enabling transistors, the series connected enabling and gating transistors having the collectors and emitters thereof in series, the bases of two gating transistors from different circuit groups being coupled together, means applying a control signal of predetermined duration to the last-mentioned bases to render the respective transistors conductive, and means alternatively rendering the two enabling transistors conductive during the time said control signal is applied to said two last-mentioned gating transistors.

28. The combination of claim 27 including a plurality of electrically energizable visua indicators coupled to said gating transistors, respectively, each indicator being coupled to a different one of said gating transistors, and a source of energizing potential coupled in series with each indicator and the gating transistor coupled thereto whereby rendering a gating transistor conductive results in energization of the respective indicator.

29. For use in a signal-seeking receiver for automatically tuning to individual ones of a predetermined plurality of radio frequencies which includes means for receiving radio frequency signals and reproducing the intelligence therein, the combination comprising, (a) means including a tuning circuit having a plurality of frequency-determining means for tuning said receiving means to receive said plurality of radio frequencies, (1) said frequency-determining means including a plurality of crystals in an oscillator circuit, said oscillator circuit including an amplifier, one terminal of each crystal being coupled to said amplifier and the other terminal of each crystal also being coupled to said amplifier by means of individual switching circuits, there being a different switching circuit for each crystal, (b) first means for providing a first control signal in response to reception of a radio frequency signal on one of said radio frequencies, (c) second means responsive to the absence of said first signal for automatically and repetitively sequentially selecting said plurality of crystals whereby said receiver is correspondingly repetitively sequentially tuned to receive said pluralitp of radio frequencies and responsive to the presence of said first signal for terminating said selecting action whereby said tuning means remains on the frequency selected at the time of said termination, and (d) said second means including said switching circuits which comprise:

(1) a plurality of transistors having first common elements thereof connected together, each switching circuit includes at least one of said transistors, second common elements thereof being connected individually to different ones of said other crystal terminals, (2) means for biasing said transistors to a normally non-conductive state, and (3) means for rendering said transistors sequentially repetitively conductive whereby said crystals are correspondingly switched into said oscillator circuit.

30. The combination of claim 1 wherein said signal-generating means includes:

(a) a scanning-signal generator which generates a repeating signal at a predetermined repetition rate, (b) a first ring counter including a binary counter coupled to said scanning-signal generator and a plurality of logic gates coupled to said binary counter for generating a plurality of sequentially occurring gating signals, (c) a second ring counter coupled to said scanning-signal generator for producing a plurality of sequentially occurring enabling signals, (d) said gating and enabling signals occurring in time spaced logical pairs, and (e) means for applying said logical pairs of said gating and enabling signals to said switching circuits.

31. The combination of claim 30 wherein the number of said predetermined plurality of radio frequencies is equal to the number of said logical pairs of enabling signals and gating signals.

32. The combination of claim 1 in which said frequency-dividing circuitry includes a first square wave generator for producing a first pair of oppositely phased square waves at a frequency proportional to the repetition rate of said repeating signal, and second and third square-wave generators for generating second and third pairs of oppositely phased square waves at frequencies of one-half and one-fourth the frequency of said first square waves respectively.

33. The combination of claim 3 in which said oscillator includes a transistor to the base of which said crystals are coupled, the collectors of said gating transistors, respectively being connected to said crystals, the collector and emitter of said enabling transistor being series connected between the emitters of said gating transistors and ground, the transistor of said oscillator also being connected to ground.

34. The combination of claim 33 in which said scanning-signal generator is a first free-running multivibrator; the means for producing said enabling signals including a second flip-flop multivibrator having two output circuits, said second multivibrator including means for producing in said output circuit, two repetitive signals, respectively, of opposite polarity at a frequency one-half that of said first multivibrator; the means for producing said gating signals including third and fourth multivibrators each having one input and two output circuits, one output circuit of said second multivibrator being connected to the input circuit of said third multivibrator, one output circuit of said third multivibrator being connected to the input circuit of said fourth multivibrator, each said third and fourth multivibrator producing opposite polarity signals in the output circuits at half the frequency of the preceding multivibrator, four gates each having two input circuits and one output circuit, one input circuit of each of the first and second gates being connected together and to one output circuit of the fourth multivibrator, the other input circuit of said first gate being connected to one input circuit of the third gate and to one output circuit of the third multivibrator, the other input circuit of the second gate being connected to one input circuit of the fourth gate and to the other output circuit of the third multivibrator, the other input circuits of the third and fourth gates being connected together and to the other output circuit of the fourth multivibrator; the output circuits of the gates being, respectively, connected to the bases of the gating transistors, there being at least one of the gating transistors for each gate output circuit, and one of the output circuits of the second multivibrator being connected to the base of the enabling transistor.

35. The combination of claim 34 in which there are two enabling transistors and said gating transistors are in two separate categories, each category including a plurality of gating transistors, the emitters of one category of gating transistors being connected to the collector of one enabling transistor, the emitters of the other category of gating transistors being connected to the collector of the other enabling transistor, the emitters of said enabling transistors being coupled together, the two output circuits of said second multivibrator being connected to the bases, respectively, of said two enabling transistors, and the bases of pairs of gating transistors, one gating transistor from each category forming a pair, being connected together and to the gate output circuits, respectively, there being a different pair connected to each output circuit.

36. The combination of claim 1 including squelch means responsive to the first and second signals of said first means for alternatively activating and deactivating, respectively, said amplifier whereby the latter reproduces intelligence contained in the received signal in time coincidence with said first signal and is disabled during the occurrence of said second signal.

37. The combination of claim 14 including means for manually producing said enabling and gating signals to sequentially select said plurality of frequency-determining means.

References Cited

UNITED STATES PATENTS

| | | | |
|---|---|---|---|
| 2,166,691 | 7/1939 | Pare | 325—469 XR |
| 2,553,366 | 5/1951 | Fry | 331—161 XR |
| 3,470,481 | 9/1969 | Myers et al. | 325—31 XR |
| 3,482,166 | 12/1969 | Gleason | 325—334 XR |

ROBERT L. GRIFFIN, Primary Examiner

A. H. HANDAL, Assistant Examiner

U.S. Cl. X.R.

325—470

PO-1050
(5/69)

UNITED STATES PATENT OFFICE
CERTIFICATE OF CORRECTION

Patent No. 3,531,724 Dated September 29, 1970

Inventor(s) George H. Fathauer

It is certified that error appears in the above-identified patent and that said Letters Patent are hereby corrected as shown below:

IN THE SPECIFICATION

Col. 2, line 47, change "furtrer" to --further--;
Col. 5, line 9, change "as" to --or--;
Col. 7, line 32, change "received" to --receive--;
line 52, change "on" to --of--;
Col. 8, line 41, before the numeral "35" insert --capacitor--.

IN THE CLAIMS

Claim 2, col. 9, line 23, change the numeral "1" to --14--;
Claim 6, col. 9, line 57, change "ssaid" to --said--;
col. 9, line 55, change "multivabrator" to --multivibrator--;
Claim 8, col. 10, line 39, change "conected" to --connected--;
Claim 9, col. 10, line 47, change "betwen" to --between--;
Claim 10, col. 10, line 53, change "cuts" to --cuits--;
Claim 13, col. 11, line 1, change the numeral "12" to --17-;
Claim 15, col. 11, line 17, change "combniation" to --combination--;
col. 11, line 21, change "lamp" to --indicator--;
Claim 17, col. 11, line 42, change "sequential-switching circuit" to --frequency-dividing circuitry--;
Claim 18, col. 11, line 56, delete "frequencies which includes means for receiving radio";
Claim 27, col. 14, line 6, change "alternatively" to --alternately--;
Claim 28, col. 14, line 11, change "visua" to --visual--;
Claim 29, col. 14, line 43, change "pluralitp" to --plurality-;
Claim 30, col. 14, line 62, change the numeral "1" to --14--;
Claim 32, col. 15, line 7, change the numeral "1" to --14--;
Claim 36, col. 16, line 25, change the numeral "1" to --7--.

SIGNED AND SEALED
FEB 9 1971

(SEAL)
Attest:

Edward M. Fletcher, Jr
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,531,724 Dated September 29, 1970

Inventor(s) GEORGE H. FATHAUER

It is certified that error appears in the above-identified patent and that said Letters Patent are hereby corrected as shown below:

IN THE CLAIMS

Claim 2, Column 9, line 29 - change "oscillator" to --tuning circuit--

Claim 11, Column 10, line 64 - change "oscillator" to --tuning circuit--

Claim 30, Column 14, lines 64 and 65 - delete "(a) a scanning-signal generator which generates a repeating signal at a predetermined repetition rate"

Claim 33, Column 15, lines 16 and 17 and 22 - change "oscillator" to --tuning circuit--

Signed and sealed this 24th day of August 1971.

(SEAL)
Attest:

EDWARD M.FLETCHER,JR.
Attesting Officer

WILLIAM E. SCHUYLER, JR.
Commissioner of Patents